(12) United States Patent
Negahban et al.

(10) Patent No.: US 11,057,897 B1
(45) Date of Patent: Jul. 6, 2021

(54) AUTOMATIC EVENT-BASED REQUEST COMMUNICATION (ERC) GENERATION AND ERC ROUTING BASED ON RESOURCE CAPABILITIES

(71) Applicant: BEAMLIVE INC, Woodside, CA (US)

(72) Inventors: Mehrdad Negahban, Woodside, CA (US); Michael Patrick Jones, Woodside, CA (US); Sahand Negahban Hagh, Woodside, CA (US); Brad Andrew Keahi Beck, Woodside, CA (US)

(73) Assignee: BEAMLIVE INC, Woodside, CA (US)

( * ) Notice: Subject to any disclaimer, the term of this patent is extended or adjusted under 35 U.S.C. 154(b) by 0 days.

(21) Appl. No.: 17/078,067

(22) Filed: Oct. 22, 2020

Related U.S. Application Data

(60) Provisional application No. 63/198,383, filed on Oct. 14, 2020.

(51) Int. Cl.
  *H04W 72/04* (2009.01)
  *H04W 4/90* (2018.01)
(52) U.S. Cl.
  CPC ........... *H04W 72/048* (2013.01); *H04W 4/90* (2018.02)
(58) Field of Classification Search
  CPC ... H04W 72/048; H04W 4/90; H04W 76/007; H04W 4/22
  USPC ......................................................... 370/329
  See application file for complete search history.

(56) References Cited

U.S. PATENT DOCUMENTS

| | | | |
|---|---|---|---|
| 8,792,867 B1 | 7/2014 | Negahban | |
| 8,913,981 B1 * | 12/2014 | Schumacher | H04W 4/90 455/404.1 |
| 8,948,732 B1 | 2/2015 | Negahban | |
| 8,965,988 B1 | 2/2015 | Negahban | |
| 10,616,412 B1 * | 4/2020 | Brosowsky | H04M 3/5116 |
| 2004/0176123 A1 * | 9/2004 | Chin | H04L 12/2854 455/521 |
| 2009/0003659 A1 | 1/2009 | Forstall | |
| 2009/0154659 A1 | 6/2009 | Morin | |
| 2012/0214437 A1 * | 8/2012 | Ray | H04W 52/0261 455/404.2 |
| 2017/0078226 A1 * | 3/2017 | Daly | H04L 51/066 |
| 2017/0156045 A1 | 6/2017 | Balabhadruni | |
| 2019/0313230 A1 | 10/2019 | MacGabann | |
| 2019/0335298 A1 | 10/2019 | Mbonye | |
| 2020/0221279 A1 * | 7/2020 | Mehta | H04W 76/50 |

\* cited by examiner

*Primary Examiner* — Charles N Appiah
*Assistant Examiner* — Frank E Donado
(74) *Attorney, Agent, or Firm* — Esplin & Associates, PC

(57) ABSTRACT

Disclosed is a system and method of automatically generating an event-based request communication ("ERC") and routing the ERC to a public safety answering point ("PSAP") (or other call center) to service the ERC based on PSAP profiles that each specify capabilities of a given PSAP. A client device may be programmed to obtain the capabilities of a relevant PSAP, and generate and communicate an ERC based on the capabilities of the PSAP. The ERC may be generated in a format that the relevant PSAP is capable of processing. The format may include a voice call, a text message, an electronic mail message, a shortwave radio communication, and/or other type of broadband wireless or wireline communication.

16 Claims, 4 Drawing Sheets

AUTOMATIC EVENT-BASED REQUEST COMMUNICATION (ERC) GENERATION AND ERC ROUTING BASED ON RESOURCE CAPABILITIES

FIELD OF THE INVENTION

The invention relates to a system and method of determining the capabilities of resources to service event-based requests generated by disparate sensors and/or other devices and using the capabilities information of a given resource to automatically generate event-based request communications ("ERC") consistent with the capabilities of the resource.

BACKGROUND OF THE INVENTION

In a variety of contexts, sensors and/or other devices create and communicate requests that need to be serviced by a resource. In some cases, a specific resource will be allocated to service the request based on predetermined criteria. In other cases, one of a number of resources may be capable of servicing the request and one may be selected to handle the specific request.

SUMMARY OF THE INVENTION

With the growth of the Internet of Things (IoT) and connected devices, servicing of requests may become more complex. In part, this may be due to the fact that different sensors and/or different resources have different communication capabilities and/or other relevant responding or management capabilities.

One example of where this issue may manifest itself is next generation 911 (NG911) calls. Currently, 911 requests are primarily handled by a phone call that is routed to a resource referred to as a PSAP. A conventional PSAP is a call center responsible for servicing 911 voice calls made to an emergency telephone number, where a 911 operator answers the call, speaks to the caller to determine the nature of the emergency (including, for example, location) and assigns the request to a first responder (e.g., police, firefighters, ambulance service, and/or other resources). In the United States, usually a PSAP is assigned responsibility for servicing 911 calls made from a given calling area. A 911 call made in the US is directed to a PSAP assigned with a service area that services the caller's location. Conventional PSAPs typically have the capability of receiving requests by voice calls or limited text only, and then subsequently servicing the request through voice or text only.

It would be beneficial to communicate 911 requests and/or facilitate servicing the 911 requests using richer (e.g., more robust) types of content other than just voice or text. For example, for 911 or other requests, it would be beneficial to be able to transmit text, pictures, video files, live streaming video, audio files, live streaming audio, live sensor information (e.g., Global Positioning System (GPS) information or other location information, biometric sensor information, crash sensor information, building security information, personal SoS information and alerts, etc.), and/or other information. Alternatively or additionally, it would be beneficial to be able to transmit the foregoing and other types of content using various different communication protocols (e.g., via networking TCP/IP protocols or other network-based protocols, Short Messaging Service protocols, Multimedia Messaging Service protocols, etc.). Still alternatively or additionally, it would be beneficial to be able to service requests made from different types of devices, such as from landline phones, mobile phones, sensor devices, vehicles, building and/or other devices from which a request can be made. With the advent of NG911, some PSAPs are, or will, begin having the capability to receive 911 requests via content other than text and possibly via different types of communications protocols. Not all PSAPs will have the same range of communication capabilities, at least at first and likely for some time in the foreseeable future.

For example, not all PSAPs have or will have the capability to receive text, media, sensor information, and other file types and/or handle all communication protocols that various requesting devices may be able to provide. This creates a technical problem with respect to determining which file types and communication protocols should be used for a given request, assuming there is an assigned PSAP in that service area.

Thus, there is a technical challenge in connection with a person (very heavy on people rather than sensors and devices) knowing, for a given request and based on where they are at the time of the request, which PSAP will be assigned to handle the request and the capabilities of that PASP (e.g., capabilities to receive text, media, location and different file types, communicate via different communication protocols and/or other capabilities).

Furthermore, although modern communication systems have scaled to accept increasing demands, in times of crises and other instances of high network loads, these communication systems may not be able to handle increased traffic. Being able to make event-based requests through alternate communication channels would be desirable. However, the ability to use alternate communication channels depends on the PSAPs technical capabilities.

These and other drawbacks and technical limitations exist with current PSAP systems and technology. Similar problems exist more broadly in connection with communication by other sensors and connected devices that generate event-based requests for service that are communicated to other resources.

The disclosure addresses these and other technical drawbacks of current systems.

One aspect of the present disclosure relates to a system and method for determining the capabilities of resources for servicing event-based requests based on resource profiles that specify communication and/or other capabilities of a given resource. The system and method may be configured to service the event-based requests generated by disparate sensors and/or other smart or IoT devices, by using the capabilities to automatically generate an event-based request communication ("ERC") consistent with the capabilities, and routing the ERC to the resource to service the request. Various approaches can be used consistent with these and/or other aspects of the present disclosure.

According to one approach, a cloud-based service is provided to obtain and/or manage resource profiles, and communicate relevant resource profile information to a device. For example, in the context of 911 requests made via a smart phone (or other mobile or IoT device), the cloud-based service may transmit PSAP resource profile information to the mobile device or cloud-based service whenever the device enters a new area that is serviced by a PSAP for which the mobile device or cloud-based service does not already have such profile information (or the most up to date profile information). Alternatively or additionally, the cloud-based service can transmit the PSAP profile information for a given resource (e.g., PSAP) at the time the mobile device indicates that it needs to make a 911 request. In this way, when the mobile device is needed to issue a 911 request, it knows or obtains the PSAP profile for the area in which the device is currently located and can use this profile information to generate an ERC using the one or more different types of content and/or different types of communication protocols consistent with the PSAP capabilities for that service area. For example, the mobile device may select one or more types of content that a given PSAP is capable of handling for the ERC. Such selection may be based on one or more of one or more rules that specify the richest type of content that a given PSAP is capable of handling should be selected, a predefined hierarchy of which types of content should be used, one or more preferences of a user making the request, the device capabilities of a requesting device, and/or other criteria. The "richest" type of content may be specified by a predefined listing that specifies the order in which content may be considered "rich." For example, video content may be considered more rich than audio; audio more rich than text; and so on. Other orders may be used to define the "richness" of content as well.

According to another implementation, when the mobile device issues a 911 request, it is transmitted to the cloud-based service, which then determines the relevant PSAP and its capabilities and routes the communication request to the PSAP using the optimal communication preferences based on the PSAP capabilities. The communication can be a one-time request or an ongoing communication for an event. The invention is not limited to 911 and can be applied to other call centers as well.

According to another implementation, the cloud-based service may handle a variety of types of request from a variety of sensors and/or other devices. For simplicity and generality, the term sensor device may be used. The disclosure is not so limited, and principles described herein can be applied to a variety of devices that can issue event-based requests and a variety of resources that can service the requests. Variety of devices can be smart devices such as smartphones, tablets, personal computers, web browser enabled communication, personal SoS devices and IoT devices generating data from connected home/building, connected vehicle, medical sensors, SoS devices, and/or other devices. Variety of resources can be emergency 911, transportation, delivery of goods and services, and/or other resources.

The sensor device may be programmed with an application that is configured to facilitate communication with the cloud-based service and/or the sensor device may be configured with code that automatically routes requests from the sensor device to the cloud-based service. The cloud-based service may obtain and/or store a capabilities profile for the sensor devices and for the resources that are available to service event-based requests from the sensor devices.

The cloud-based service may, for a given request, determine one or more of the following as needed: the nature of the request, the type of resource needed to service the request, a specific resource for handling the request, the capabilities of the sensor device, the capabilities of the specific resource, the availability of bandwidth on one or more relevant communication channels, and/or other information. The cloud-based service may, based on the determined information, identify a type of resource to which an ERC should be routed (e.g., identify a PSAP or other type of resource), identify resources that may be required to service the request (e.g., whether a hospital one mile away or a hospital three miles away with more relevant capabilities should be used), and/or identify the type of content to be provided in the ERC (e.g., whether video, audio, text, etc., should be provided).

The cloud-based service may then communicate the capabilities and/or identified information (e.g., the type of resource, particular resources needed to service the request, type of content to be transmitted, etc.) to the sensor device or use the capabilities to generate an ERC and communicate it to the relevant resource(s).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
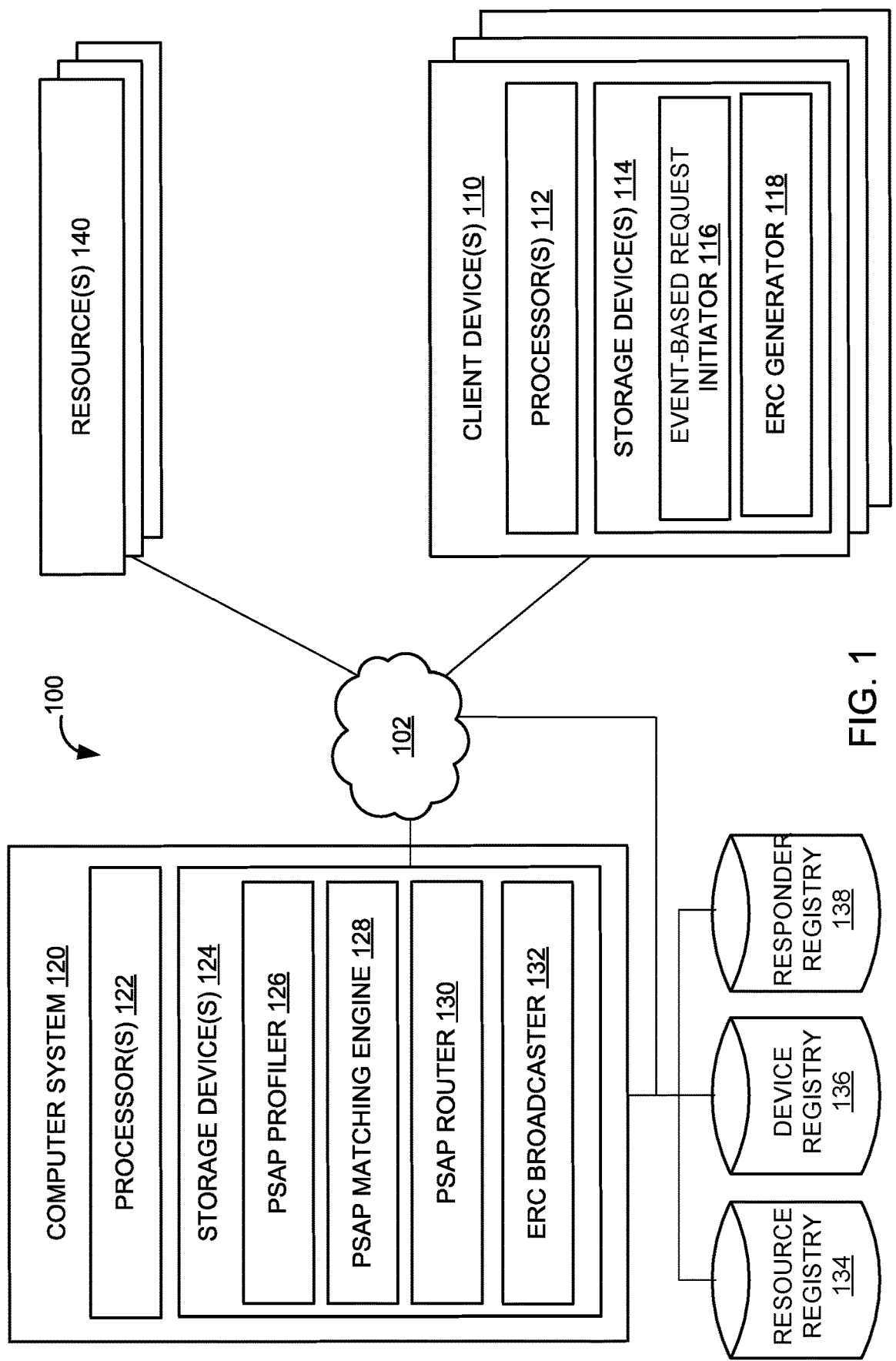
FIG. 1 illustrates a system of automatically generating an ERC and routing the ERC to a resource to service the ERC based on resource profiles that specify capabilities of a given resource, according to an implementation.

One or more implementations described herein relates to a system 100 for determining the capabilities of resources for servicing event-based requests based on resource profiles that specify communication and other capabilities of a given resource to service the event-based requests generated by disparate sensors and/or other devices and using the capabilities to automatically generate an event-based request communication ("ERC") consistent with the capabilities and routing the ERC to the resource to service the request. Various approaches can be used consistent with this aspect of the invention.

In various examples throughout, although various implementations are described with respect to automatically routing an emergency request (e.g., a "911 call") based on PSAP profiles (e.g., resource profiles relating to PSAPs), the foregoing implementations are used for illustrative purposes. Other types of service requests may be automatically generated and routed based on profiles as described herein.

As used herein, the term "Event-based Request Communication" (and its acronym, ERC) refers to a communication that conveys a request for a resource relating to an event. An ERC may specify a particular type of resource that is requested, which may be based on the event to which the ERC relates. A type of resource may include, without limitation, an emergency resource such as a PSAP or first responder (e.g., in relation to an emergency event), a transportation resource such as a tow truck or taxi service (e.g., in relation to a commuting event), an entertainment resource such as a restaurant or movie theatre (e.g., in relation to a social event), and/or other type of resource that may be requested. An ERC may request multiple resources, as appropriate (e.g., a transportation and entertainment resource for a social event). An ERC may include or otherwise be associated with one or more ERC parameters that specify information to convey information relating to the event. In some instances, an ERC parameter may be used by the system 100 select one or more resources for servicing the ERC. Examples of ERC parameters include, without limitation, a type of resource requested, a requirement that should be fulfilled by the resource, information relating to the event, and/or other information used to select resource(s) to service the ERC. A resource may be associated with a resource profile that specifies the capabilities of the resource. As such, the system 100 may use the resource profile together with the ERC parameters to select a resource to service an ERC (and/or a manner in which an ERC is communicated to the resource).

An ERC may be conveyed via (and may be formatted according to) one or more types of communication channels. A communication channel may include a format or medium through which a communication may be sent. For example, and without limitation, a communication channel may include a voice (e.g., audio) channel, an image (e.g., video or photographic) channel, a text-based (e.g., Short Message Service (SMS)) channel, a multi-media Message Service (MMS) channel, electronic mail, and/or other type of format or medium through which a communication may be sent. As such, an ERC may include a phone call, an SMS text message, an MMS message, an electronic mail message, and/or other communication through which information may be transmitted. The conveyance may include performing a format conversion (e.g., voice to text, text to voice, etc.).

In an implementation, the system 100 may include a client device 110, which may be operated by an end user making an event-based request. The client device may be programmed to initiate an event-based request based on one or more triggers that indicate an event-based request should be made. The one or more triggers may include, without limitation, user input via one or user interface members, placement of a phone call (e.g., to "911"), detection of a condition (e.g., based on sensor data), and/or other information indicating that an event-based request should be initiated. It should be noted that the event-based request may be triggered by other devices as well (such as a device operated by another user making an event-based request on behalf of another user).

The system 100 may detect a triggering event that indicates an event-based request should be initiated. Responsive to the triggering event, the system 100 may identify a relevant PSAP to service the event-based request. The system 100 may identify the relevant PSAP based on a location of a requesting device and a service area of the relevant PSAP. In some instances, the system 100 may identify capabilities of the relevant PSAP. Based on the capabilities, the system may generate an ERC and route the ERC to the relevant PSAP. For example, the system 100 may generate an ERC in the form of an SMS text message if the relevant PSAP is capable of receiving such messages. On the other hand, the system 100 may generate an ERC in the form of a call (e.g., a 911 call) to the relevant PSAP if the relevant PSAP is capable of receiving only calls.

Alternatively or additionally, the system 100 may identify a relevant PSAP based on a combination of factors such as, without limitation, a location of the requesting device, a service area of a PSAP, PSAP capabilities, device capabilities (e.g. whether a requesting device is SMS-capable), network availability, user preferences, incident parameters (which specify the incident for which the emergency request is being made), and/or other information. Using the system 100, a user may request emergency services according to capabilities of a PSAP. For example, emergency requests may be made via SMS text, phone call, electronic mail, and/or other communication channel through which a relevant PSAP is capable of communicating. In some instances, a user may specify a preference of the type of communication channel to use (whether at the time of making the emergency request or via preconfigured preferences). In some instances, the type of communication channel to use may be based on rules that specify which communication channel(s) should be used, subject to capabilities of a relevant PSAP.

Having described a high level overview of various implementations of generating and routing ERCs based on resource capabilities, attention will now be turned to an example of system 100 that implements the foregoing.

Exemplary System Architecture

FIG. 1 illustrates a system 100 of automatically generating an ERC and routing the ERC to a resource to service the ERC based on resource profiles that each specify capabilities of a given resource, according to an implementation of the invention. In an implementation, system 100 may include one or more of a client device 110, a computer system 120, a resource 140, and/or other components.

System Registries

System 100 may generate and maintain one or more registries that each store information used to identify a relevant resource, relevant responders, and/or otherwise used to generate and route ERCs to a relevant resource. Such registries may include, without limitation, a Resource registry 134 that stores resource profiles, a device registry 136 that stores client device profiles, a responder registry 138 that stores responder profiles (it should be noted that a responder may be considered a resource as well), and/or other information used to select a given resource to service a given request. One or more of the registries (or portions thereof) may be stored at client device 110, computer system 120, and/or at another device accessible to client device 110 and/or computer system 120. The one or more registries may be stored using one or more databases described herein.

Resource Registry

In an implementation, Resource registry 134 may include information relating to a plurality of resources 140. For example, and without limitation, for a given resource 140, Resource registry 134 may store contact information of the resource (e.g., phone number, electronic address, etc.), capabilities of the resource (e.g., type of communication channels through which the resource is capable of communicating, type of services rendered such as emergency services, towing services, dining services, entertainment services, etc.), capabilities of responders to which the resource has access (e.g., emergency equipment available), assigned service locations (e.g., locations over which the resource has responsibility), and/or other information for a given resource. Each resource 140 may have a corresponding resource profile that stores the foregoing information relating to the resource.

In an implementation, a given resource (e.g., a provider of the resource) may register with the system 100 to provide information used in its resource profile. For example, a government agency may provide PSAP capabilities, responder capabilities, and other government-provided service information to the system so that the system can register the PSAP, responder, and other government-provided resource in its system. In another example, a restaurant may provide (and the system may receive) information relating to its cuisine, menu, service hours, location, and/or other information relating to the restaurant. In response, the system 100 may generate a resource profile (in this case, a restaurant profile) for the restaurant so that the restaurant may be potentially selected to service any ERCs relating to a request for dining and/or may be identified for routing the ERC. Other types of resources may likewise register with the system 100 so that their respective resource profile may generated or updated.

In an implementation, the system 100 may register a resource without the resource explicitly registering with the system 100. In this implementation, the system 100 may use publicly available or other information obtained about the resource to add the resource to the resource registry.

Whether a resource has provided registry information, or the system 100 has actively obtained such information, the system 100 may generate or update a resource profile for the resource and subsequently select the resource to service ERCs.

Device Registry

In an implementation, device registry 136 may include information relating to a plurality of client devices 110. For example, and without limitation, for each client device 110, device registry 136 may store communication channels through which the client device 110 is capable of communicating, on-board sensor capabilities (e.g., type of camera device (if any), type of location sensors, etc.), identifying information (e.g., manufacturer, model, MAC address, etc.) and/or other information relating to the client device 110. It should be noted that the device registry may store information relating to types of devices (e.g., by manufacturer/model) and/or particular devices (e.g., particular devices registered with the system).

Responder Registry

In an implementation, responder registry 138 may include information relating to a plurality of responders. For example, and without limitation, for each responder, responder registry 138 may store contact information (e.g., phone numbers, electronic addresses, etc.), type of responder (e.g., police, fire, etc.), capabilities of the responder (e.g., SWAT, first aid, types of equipment available to the responder, etc.), service areas of the responder (e.g., locations in which the responder is able to handle), and/or other information relating to responders.

Client Device 110

Client device 110 may include one or more processors 112 (also interchangeably referred to herein as processors 112, processor(s) 112, or processor 112 for convenience), one or more storage devices 114, and/or other components. Processors 112 may be programmed by one or more computer program instructions. For example, processors 112 may be programmed by an event-based request initiator 116, an ERC generator 118, and/or other instructions. As used herein, for convenience, the various instructions will be described as performing an operation, when, in fact, the various instructions program the processors 112 (and therefore client device 110) to perform the operation. Client device 110 may include a standalone device (e.g., a smartphone) or may be incorporated within a system (e.g., a sensor, computing, or other device incorporated within an automobile).

Initiating an Event-Based Request Communication

In an implementation, event-based request initiator 116 may be included with an application (e.g., a "mobile app") executing at a client device 110 and/or may be embedded within a system (e.g., a system-level process). Regardless, event-based request initiator 116 may initiate an event-based request based on one or more triggers. The one or more triggers may include, without limitation, user input via one or user interface members, placement of a phone call (e.g., to "911"), detection of a condition (e.g., based on sensor data), and/or other information indicating that an event-based request should be initiated.

For client devices 110 having user inputs, event-based request initiator 116 may respond to manipulation of a user input to initiate an event-based request. For example, and without limitation, a mobile app executing at a client device 110 may display a user interface that includes an event-based request "soft" button (e.g., a soft user interface member that is displayed on a graphical user interface and is not a hardware interface member) that, when selected, causes an event-based request to be initiated. A voice interface executing at a client device 110 may use speech inputs to recognize verbal commands (e.g., "contact 911").

Alternatively or additionally, event-based request initiator 116 may continuously (e.g., at predefined intervals) monitor manipulation of a user interface member such as a hard interface member (e.g., power or volume buttons) or a soft interface member. When manipulation of the user interface member is detected based on the monitoring, client device 110 may initiate the event-based request. Such triggers may be predefined and/or configurable by a user of client device 110. For instance, a user may configure their smartphone to cause an event-based request to be initiated when a volume rocker button is depressed for two seconds or other predefined time period. Such manipulation may be detected only when certain applications are executing (e.g., active or background applications), detected regardless of any running applications, detected only when a client device 110 is powered on, detected even when a client device 110 is powered off, and/or at other times.

To function when client device 110 is powered off, client device 110 may be manufactured or otherwise configured to couple event-based request initiator 116 to a circuit board of the client device 110, which ties the manipulation of an appropriate user interface member to a power-on action and/or initiation of an event-based request as described herein. For instance, the appropriate user interface member may cause a momentary short circuit on the circuit board, which causes the circuit board to power on the client device and/or initiate the event-based request. Other ways of causing a power-on and/or other process initiation may be used as well.

In some implementations, an event-based request may be initiated based on a call made by a user, such as a user dialing "911". In these implementations, event-based request initiator 116 may monitor outgoing calls made by client device 110. If a relevant dialed number (e.g., 911) is detected, event-based request initiator 116 may initiate the event-based request, which may result in a conventional voice call to the dialed number (e.g., a 911 call) and/or other communication to be initiated, as will be discussed below. In some instances, event-based request initiator 116 may interrupt processing the dialed number until the event-based request is processed.

In some implementations, an event-based request may be initiated based on a detected condition. For example, event-based request initiator 116 may monitor sensor information to determine whether a triggering condition has been met. Such sensor information may include, without limitation, crash detection sensors that sense when an automobile crash has been detected (e.g., in which a triggering condition may include airbag deployment), biometric sensors that detect abnormal physiological states (e.g., in which a triggering condition may include physiological states that indicate medical attention is required), environment sensors that detect abnormal ambient states (e.g., in which a triggering condition may include ambient conditions that indicate that an unsafe condition may cause a dangerous condition), and/or other sensor information. As would be appreciated, the various types of sensor information may be obtained from sensors that are on-board (e.g., within a housing of) client device 110 and/or sensors that are remote from client device 110.

Modes of Communication for the Event-Based Request

In some implementations, event-based request initiator 116 may initiate an event-based request based on one or more communication mode settings that specify a mode of communication that should be used to communicate an ERC. The communication mode settings may include default values, which may be configured by a user and stored as user preferences, and/or may be configured by a user at the time of initiating an event-based request. For example, and without limitation, event-based request initiator 116 may be configured to initiate only conventional voice emergency call, regardless of augmented capabilities that a nearby PSAP 140 may have. Alternatively, event-based request initiator 116 may be configured to initiate SMS text-based ERCs or other types of augmented capabilities if available. Combinations of different types of ERCs may be specified as well. Alternatively or additionally, event-based request initiator 116 may be configured to initiate different modes of communication based on hierarchies. For instance, event-based request initiator 116 may be configured to first attempt voice-based calls to be initiated, then next attempt (if voice is unavailable such as when a mobile call network is congested) SMS text-based ERCs to be initiated, then next attempt video based ERCs to be initiated, and so on.

In some instances, event-based request initiator 116 may receive a preference for the mode of communication at the time of receiving a triggering condition. For example, and without limitation, an event-based request button may be displayed in association with display options that, when selected, indicate a preferred mode of communication. This allows a user of client device 110 to specify the type of communication that should be used for the ERC. In a particular example, a user in distress may wish for silent communications to occur, in which case the user may select a preference for SMS text-based requests to be preferentially initiated, if a nearby PSAP is so capable. In this manner, a user may request emergency services via text message, rather than voice, if available. On the other hand, if SMS is unavailable (e.g., a nearby PSAP is unable to process SMS messages), event-based request initiator 116 may at least mute any speaker devices (and/or dim or shut down display devices) and cause a voice call to 911 or other emergency number to be dialed responsive to an indication of the preference for SMS only requests.

Content Type

In some instances, the system (e.g., one or more of system 100, the client device 110, and/or computer system 120) may select one or more types of content that a given PSAP is capable of handling for the ERC. Such selection may be based on one or more rules that specify the richest type of content that a given PSAP is capable of handling should be selected, based on a predefined hierarchy of which types of content should be used, one or more preferences of a user making the request, the device capabilities of a requesting device, and/or other criteria. The "richest" type of content may be specified by a predefined listing that specifies the order in which content may be considered "rich." For example, video content may be considered more rich than audio; audio more rich than text; and so on. Other orders may be used to define the "richness" of content as well.

Obtaining PSAP Capabilities

In an implementation, to initiate an event-based request, event-based request initiator 116 may transmit a PSAP capabilities request to computer system 120 via network 102. Responsive to the PSAP capabilities request, computer system 120 may provide, and event-based request initiator 116 may receive, a response to the PSAP capabilities request. The response may include a PSAP profile that specifies the PSAP's capabilities and/or other information.

In some implementations, the response may include a listing of relevant PSAPs, from among which event-based request initiator 116 selects based on one or more PSAP selection rules (described below with respect to PSAP router 126), and their capabilities. A given PSAP may be considered relevant if it is within a predetermined distance from a requesting device's location, within a predetermined distance from a location associated with an emergency (which may be the same as or different from the requesting device's location), would have been conventionally selected to service a given 911 call, and/or otherwise is appropriate to service a given event-based request being processed by system 100.

In other implementations, the response may include an identification of a single PSAP and its capabilities (e.g., computer system 120—not client device 110—may have selected the PSAP that will be used or otherwise only one PSAP is relevant to service the event-based request). In these implementations, event-based request initiator 116 may transmit a device profile (which may specify device capabilities), a communication mode preference, one or more incident parameters (e.g., sensor information, situational information from a user or others involved in an emergency situation), and/or other information used by PSAP router 126 to select a relevant PSAP (i.e., match a PSAP with a given emergency situation).

If a response to the PSAP capabilities request is not received within a threshold time period (e.g., a certain number of milliseconds or other time period after a PSAP capabilities request has been transmitted or a certain number of milliseconds or other time period after a PSAP capabilities request cannot be transmitted), event-based request initiator 116 may assume that either network 102 over which the request is transmitted is unavailable (due to outage, network traffic, etc.), computer system 120 is not responding, and/or other reason exists that is preventing normal communication between event-based request initiator 116 and computer system 120. Regardless, if the response to the PSAP capabilities request is not received within the threshold time period, event-based request initiator 116 may cause a conventional 911 or other emergency call to be placed. For example, if the event-based request was initiated responsive to a user dialing 911, the 911 call may be permitted to proceed. If the event-based request was initiated responsive to user input at a user interface member (e.g., a button selection that is not related to a phone application), event-based request initiator 116 may cause a 911 call to be placed. In this example, event-based request initiator 116 may provide a signal to a launcher service via a communication bus of client device 110. The signal may cause launcher service to launch a phone application of client device 110.

Generating an ERC Based on PSAP Capabilities

Once a given PSAP is identified (whether by computer system 120, event-based request initiator 116, and/or other component), ERC generator 118 may generate an ERC based on one or more capabilities of the identified PSAP, one or more communication mode settings, device capabilities, and/or other information.

Different PSAPs may be capable of receiving an event-based request through different numbers and types of communication channels. For example, a first PSAP may be capable of receiving event-based requests via voice and SMS, while another PSAP may be capable of receiving event-based requests via only voice (e.g., a conventional PSAP may be capable of receiving an event-based request via only a 911 call).

In some implementations, ERC generator 118 may generate an ERC by analyzing the capabilities of a given PSAP, communication mode settings, device capabilities, and/or other information. For example and without limitation, ERC generator 118 may generate a matrix of PSAP capabilities, communication mode settings, device capabilities, and/or other information. Other combinations of the foregoing may be used as well to generate the matrix. Alignment of matrix entries may be used to determine which communication mode to select. For instance, if a PSAP is capable of SMS and voice, the communication mode settings indicate a preference to use SMS over voice, and the relevant requesting device (e.g., client device 110) is SMS capable, an ERC formatted according to SMS may be selected. On the other hand, if the PSAP is not SMS capable, the communication mode settings specify that SMS should not be used, and/or client device 110 is not SMS capable, then an ERC in the form of a voice call will be selected.

In some instances, ERC generator 118 may generate an ERC based on one or more extrinsic factors. For example, a given communication channel may be unavailable at the time an ERC is generated and routed. In another matrix example, if a PSAP is capable of SMS and voice, the communication mode settings specify that voice should be used, and client device 110 is SMS capable, ERC generator 118 may generate an ERC in the form of a voice call (e.g., a 911 call). If, however, the original ERC cannot be completed due to extrinsic factors (such as a call network being unavailable due to outage, congestion, or other reason), ERC generator 118 may generate an ERC in an alternate form, such as SMS, which may be available even when voice is not. This process may continue until all permutations of PSAP capability, communication mode settings, and device capabilities are tried. For instance, if SMS is unavailable, ERC generator 118 may generate an ERC in yet an alternate form (e.g., electronic mail via a wireless network), and so on.

In some implementations, a given emergency event, such as a car accident, may be associated with one or more ERCs. An initial ERC may request an emergency service. For example, depending on the capabilities of a PSAP selected to service an ERC and to which the ERC will be routed, an initial ERC may simply be a phone call such as a 911 call to a PSAP that can handle only 911 calls, or may be in the form of another format that can include incident parameters that conveys specifics about an emergency event (e.g., an SMS text message that includes the incident parameters to a PSAP that can handle SMS messaging)). Continuing the foregoing car accident example, the incident parameters may include information indicating that the car was involved in a car accident, a location of the car accident, information relating to the car (e.g., including year, make, model, color, registration information, vehicle identification number, etc.), and/or other information that describes an emergency event.

In some implementations, multiple ERCs may be associated with a given emergency event. For instance, ERC generator 118 may continue to transmit subsequent ERCs that include incident parameters during an emergency event. Such ERCs may be formatted according to the capabilities of the PSAP to which the initial ERC was routed.

A subsequent ERC may include incident parameters that are gathered or are otherwise obtained after the initial ERC. Still continuing the foregoing car accident example, a subsequent ERC relating to the car accident may include further details regarding the car accident—such as number of individuals involved, accident conditions, and/or other information. The incident parameters may include information (e.g., text) input from a user, sensor information (including still or video images from a camera, audio information from a microphone, etc.), data service (e.g., a weather service that provides information relating to current weather conditions at the time of the emergency event), and/or other information relating to the emergency event. The association may be made in various ways. A given emergency event (e.g., a case number) and a given ERC may each be assigned with a unique identifier, which are associated with one another. A unique identifier that identifies a given emergency event may be associated with other unique identifiers that each identify a corresponding ERC. In this manner, a given emergency event may be associated with one, or multiple, ERCs.

In some instances, a page relating to the emergency event may be generated and shared between various parties, such as a requester, a PSAP operator, a first responder, and/or others. Such a page may include ERCs, which are generated and routed based on PSAP capabilities. Examples of generating such pages are described in U.S. Pat. No. 8,965,988, entitled "System and method for providing an event-based and shared page connectivity platform," which issued on Feb. 24, 2015; and U.S. Pat. No. 8,948,732, entitled "System and method for responding to service requests and facilitating communication between relevant parties," which issued on Feb. 3, 2015, the entireties of each of which are incorporated by reference herein.

Computer System 120

In an implementation, computer system 120 may be programmed to identify a relevant PSAP. Computer system 120 may include one or more processors 122 (also interchangeably referred to herein as processors 122, processor(s) 122, or processor 122 for convenience), one or more storage devices 124 and/or other components. Processors 122 may be programmed by one or more computer program instructions, which may be stored on storage device 124. For example, processors 122 may be programmed by a PSAP profiler 126, a PSAP matching engine 128, a PSAP router 130, an ERC broadcaster 132, and/or other instructions. As used herein, for convenience, the various instructions will be described as performing an operation, when, in fact, the various instructions program the processors 122 (and therefore computer system 120) to perform the operation.

In some implementations, PSAP profiler 126 may obtain a profile of a PSAP (from Resource registry 134) based on an identification of a relevant PSAP, a location of a requesting device, and/or other information used to identify a given PSAP. In some instances, PSAP profiler 126 may obtain a profile of a device (either at the time of an event-based request or based on pre-registered information stored in device registry 136). In some instances, PSAP profiler 126 may obtain a profile of a responder based on responder registry 138.

In some implementations, a PSAP matching engine 128 may identify a relevant PSAP 140 based on one or more of a PSAP profile, a device profile, incident parameters, and/or other information. For example, upon receipt of a PSAP capabilities request, PSAP matching engine 128 may obtain a geographic location of a requesting device. The location may be based on location information, which may include, without limitation, an IP address, a landline location, GPS coordinates, and/or other information that indicates a location of a requesting device.

Based on the location information, PSAP matching engine 128 may consult Resource registry 134 to identify a relevant PSAP 140 by looking up one or more PSAPs responsible for processing event-based requests originating from the geographic location of the requesting device. In some implementations, PSAP matching engine 128 may obtain a PSAP profile for each of the relevant PSAPs 140. The computer system may provide an identification of a relevant PSAP 140 and its PSAP profile back to the requesting device (e.g., the client device), which may generate an ERC for routing to the relevant PSAP.

In some implementations, PSAP matching engine 128 may identify a relevant PSAP 140 and generate an ERC. In some instances PSAP matching engine 128 may route the ERC to the relevant PSAP 140 based on the capabilities of the PSAP. For instance, PSAP matching engine 128 may receive a PSAP capabilities request from a requesting device, determine a device capabilities from a device profile (which may be received with or in association with the PSAP capabilities request or obtained from a pre-stored device registry), and generate an ERC on behalf of the requesting device. Upon receipt of a PSAP capabilities request, PSAP matching engine 128 may match capabilities of a relevant PSAP and the capabilities of a requesting device to generate an ERC, which may be transmitted to the relevant PSAP by computer system 120 or the requesting device (e.g., client device 110).

In some instances, the matching may be supplemented by (e.g., based further on) incident parameters, communication channel preferences indicated by the requesting device, and/or other information that is used to identify relevant PSAPs or types of ERCs. For example, PSAP matching engine 128 may obtain one or more incident parameters that describe an emergency event for which an event-based request is being made. PSAP profiles may indicate the types of incidents that a given PSAP 140 is associated with being able to handle. For example, a PSAP profile for a PSAP 140 may indicate types of responder assets available to responders that may be contacted by the PSAP 140 to handle an event-based request. In some instances, PSAP matching engine 128 may obtain one or more communication channel preferences (such as a preference to use SMS text messaging over a voice call, electronic mail, etc.). In these instances, PSAP matching engine 128 may select PSAPs that are capable of processing event-based requests via the preferred communication channel(s).

In some implementations, once a relevant PSAP 140 is identified, PSAP router 130 may route an ERC to the relevant PSAP. In some instances, may identify contact information used to communicate with the relevant PSAP. The contact information may include, without limitation, a phone number, an electronic address (e.g., an electronic mail address), a radio frequency, and/or other information used to communication with a PSAP.

In some implementations, PSAP router 130 may forward an ERC received as a phone call from a requesting device to the relevant PSAP. In some implementations, PSAP router 130 may receive an ERC in an electronic communication format (e.g., an SMS message), and forward the ERC to the relevant PSAP 140, along with contact information related to the requesting device. For example, PSAP router 130 may provide the relevant PSAP 140 with a phone number or other electronic address at which the relevant PSAP may contact the requesting device. In this manner, the relevant PSAP 140 may, in response to receipt of the ERC, provide a return communication to the requesting device.

In some implementations, an ERC may be received from a requesting device that is in a format that is not compatible with a PSAP 140 that is responsible for handling the ERC. For example, computer system 120 may receive an SMS text message to an emergency SMS number (e.g., a text message to 911), determine that a responsible PSAP is not capable of receiving text messages, and automatically place a voice call (or other communication that the responsible PSAP is capable of processing) to the responsible PSAP. In other examples, PSAP router 130 may provide a return message to the requesting device that ERCs via text message is not available. This may inform the requesting device that the responsible PSAP is unable to process an ERC in the provided format (and may provide an identification of format(s) available for event-based requests). In these instances, the requesting device may, in response, provide a prompt to the user that another communication channel must be used to request emergency services. In some instances, the requesting device may, in response, automatically generate an ERC using another communication channel (e.g., a communication channel identified by ERC router 130).

In some implementations, a resource 140 may act as a master resource that controls or otherwise directs information relating to the ERC (and/or, in some instances, the ERC itself) to one or more slave resources. For example, a master PSAP 140 may receive an ERC and coordinate a response among slave resources, such as first responders or even other PSAPs. In this example, the master PSAP may provide slave resources relevant ERC parameters from the ERC. In some instances, the master PSAP may identify slave resources in the same or similar manner to how the PSAP was routed the ERC such as by matching ERC parameters with potential slave resource parameters. In another example, an event-planning related resource may receive an ERC, and may provide ERC parameters and/or the ERC to related slave resources. In this instance, event-planning related resource may send relevant ERC parameters to matched slave resources, such as a car service for transportation (in which case ERC parameters such as number in the party and pickup and destination locations are sent) and a restaurant for dining (in which case ERC parameters such as number in the party and cuisine preferences are provided).

In some implementations, ERC broadcaster 132 may transmit an ERC (regardless of which component generated the ERC) to one or more relevant, remote, devices. For example, based on the location of the requesting device, the computer system 120 may be programmed to identify relevant devices associated with responders or others that may be capable of responding to an event-based request. Relevant devices may be identified based on responder profiles that indicate capabilities of the responders. For instance, a first responder may be capable of handling certain incidents while a second responder may be capable of handling other incidents. In some implementations, the computer system may be programmed to transmit an ERC to any responders within an area (e.g., a predefined radius of) associated with the requesting device.

The ERC broadcaster 132 transmit the ERC using a communication channel through which a responder is capable is receiving. For instance, an ERC may be communicated as an SMS message to a first responder who is capable of receiving text messages, while the ERC may be communicated as a CB radio transmission to a second responder who is not capable of receiving text messages. In some instances, a responder may register for an application that programs the responder's device to receive and respond to ERCs. In these implementations, the computer system 120 may be programmed to transmit ERCs in a format that is compatible with the application (which may include any of the communication channels associated with an ERC or a particular format that is specific for the application).

Although each illustrated in FIG. 1 as a single component, computer system 120 and client device 110 may each include a plurality of individual components (e.g., computer devices or sensor devices) each programmed with at least some of the functions described herein. In this manner, some components of computer system 120 and/or client device 110 may perform some functions while other components may perform other functions, as would be appreciated. The one or more processors 112, 122 may each include one or more physical processors that are programmed by computer program instructions. The various instructions described herein are exemplary only. Other configurations and numbers of instructions may be used, so long as the processor(s) 112, 122 are programmed to perform the functions described herein.

Furthermore, it should be appreciated that although the various instructions are illustrated in FIG. 1 as being co-located within a single processing unit, in implementations in which processor(s) 112, 122 each include multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112, 122 may be programmed by one or more additional instructions that may perform some or all of the functionality attributed herein to one of the instructions.

The various instructions described herein may be stored in a storage device 124, 114 which may comprise random access memory (RAM), read only memory (ROM), and/or other memory. The storage device may store the computer program instructions (e.g., the aforementioned instructions) to be executed by processor 112, 122 as well as data that may be manipulated by processor 112 and/or 122. The storage device may comprise floppy disks, hard disks, optical disks, tapes, or other storage media for storing computer-executable instructions and/or data.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

Figure 2:
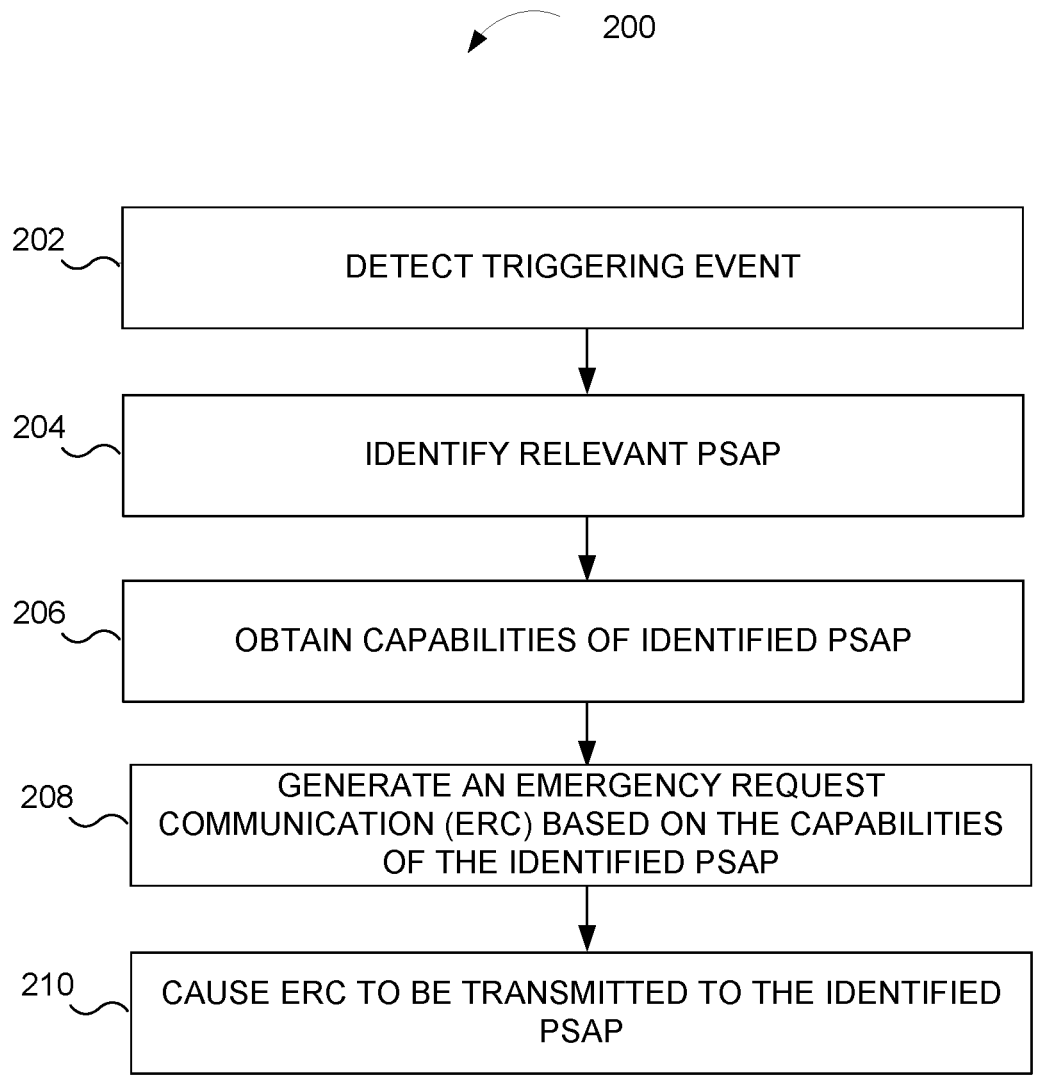
FIG. 2 depicts a process of obtaining resource capabilities and generating an ERC based on the resource capabilities responsive to detection of a triggering event, according to an implementation.

FIG. 2 depicts a process 200 of obtaining PSAP capabilities and generating an ERC based on the PSAP capabilities responsive to detection of a triggering event, according to an implementation of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an implementation, in an operation 202, process 200 may include detecting a trigger for an event-based request based on a user input. The user input may include, without limitation, an initiation of an application (e.g., a mobile app that requests emergency services), a manipulation of user interface (e.g. pressing a button that corresponds to an event-based request), initiation of a phone call to an emergency phone number, and/or other type of user input.

In an implementation, in an operation 204, process 200 may include obtaining an identification of a relevant PSAP 140. For example, a relevant PSAP 140 may be identified based on a location of a requesting device (e.g., a device implementing process 200), a capabilities of a PSAP, one or more incident parameters, and/or other information. To obtain the identification of the relevant PSAP 140 may be obtained by transmitting, to a remote computer (e.g., computer system 120), a PSAP capabilities request along with pertinent information (e.g., requesting device location, preferences, incident parameters, etc.) used to identify the relevant PSAP. Alternatively, to obtain the identification of the relevant PSAP 140, process 200 may include consulting a locally-stored Resource registry 134 (e.g., stored locally on the requesting device) to identify the relevant PSAP.

In an implementation, in an operation 206, process 200 may include obtaining information that specifies the capabilities of the identified PSAP. The capabilities may include, without limitation, a communication channel through which the identified PSAP is able to communicate, a capabilities of responders that the identified PSAP is able to deploy, and/or other capabilities of the identified PSAP to handle an event-based request. For example, the capabilities of the identified PSAP may be obtained as a response from the remote computer to which a PSAP capabilities request was made and/or from the locally-stored Resource registry 134.

In an implementation, in an operation 208, process 200 may include generating an ERC based on the capabilities of the identified PSAP. For example, and without limitation, process 200 may select a format for an ERC based on communication channel(s) that the identified PSAP is capable of processing. In a particular example, process 200 may generate an ERC in the form of an SMS text message if the identified PSAP is able to process SMS text messages. In some implementations, process 200 may select a format based on preferred communication channels. For example, process 200 may select a format based on preferences indicated by the user at the time of making the request or predefined preferences. Such preferences may define a hierarchy of communications channels that should be used. As an example, the preferences may specify that an SMS message should be used if available and, if not available, a call (e.g., 911 call) should be used. Other hierarchies specifying different or additional communication channels may be used as well. In some instances, process 200 may select a format based on availability. For example, if a phone network is unavailable, process 200 may select alternative formats that may be available (and for which the identified PSAP can handle).

In an implementation, in an operation 210, process 200 may include causing the ERC to be transmitted for provision to the identified PSAP. In some instances, process 200 may cause the ERC to be transmitted directly to the identified PSAP. In other instances, process 200 may cause the ERC to be transmitted to a remote device (e.g., computer system 120) for provision to the identified PSAP.

Figure 3:
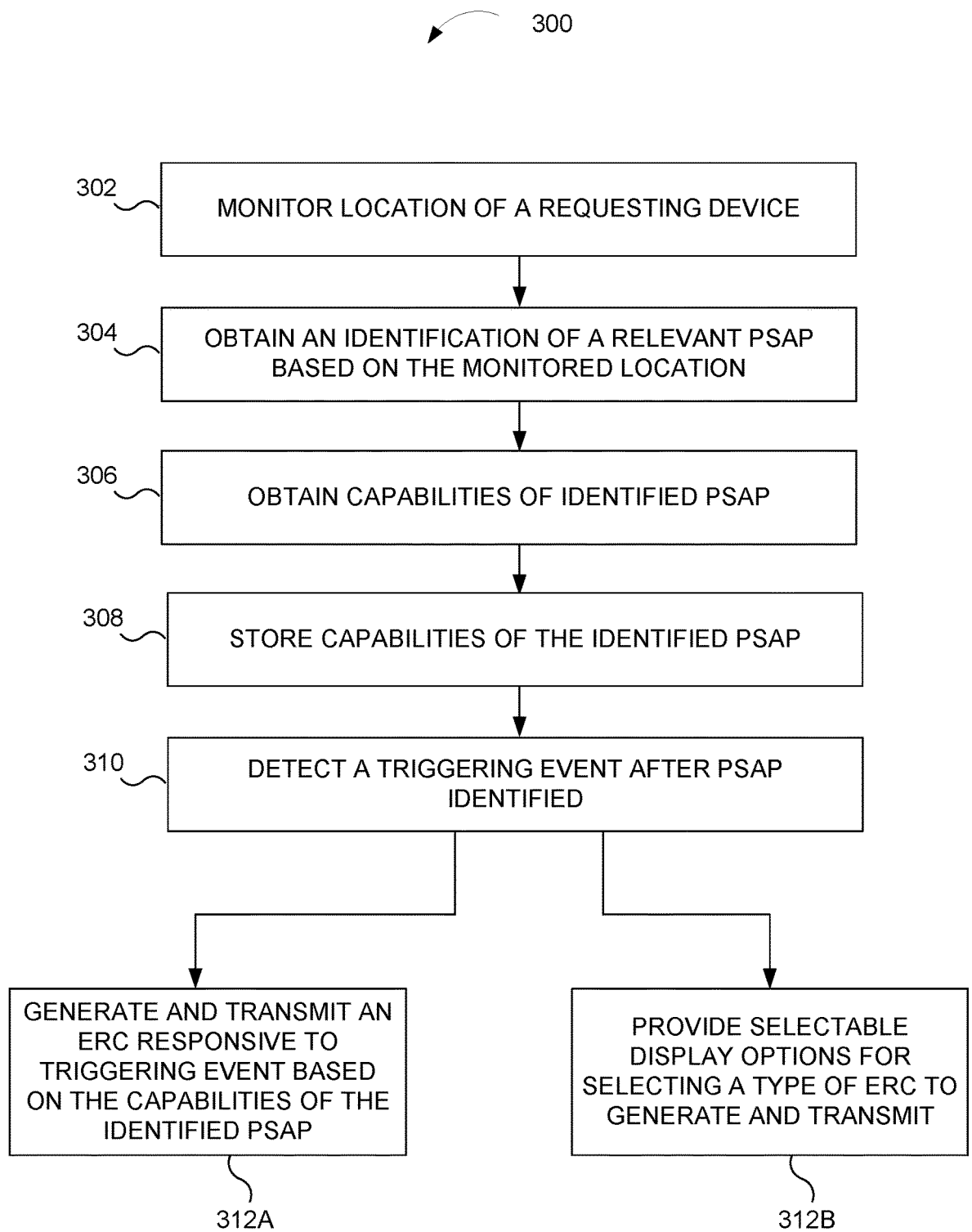
FIG. 3 depicts a process of identifying a relevant resource prior to detection of a triggering event, according to an implementation of the invention.

FIG. 3 depicts a process 300 of identifying a relevant PSAP prior to detection of a triggering event, according to an implementation of the invention.

In an implementation, in an operation 302, process 300 may monitor a location of a requesting device (e.g., client device 110 in FIG. 1) prior to detection of a triggering event. For example, process periodically (e.g., at predefined intervals) obtain a location of the requesting device.

In an implementation, in an operation 304, process 300 may obtaining an identification of a relevant PSAP. Such identification may occur as described with respect to process 200.

In an implementation, in an operation 306, process 300 may include obtaining information that specifies the capabilities of the identified PSAP.

In an implementation, in an operation 308, process 300 may storing information identifying the identified PSAP and/or the capabilities of the identified PSAP in a memory (e.g., a storage device of the requesting device). In doing so, in some instances, process 300 may delete from the memory any previously stored information relating to a previously identified PSAP. For example, when the location of the requesting PSAP has changed, so too may a responsible PSAP change. The newly responsible PSAP may have different (e.g., more or less) capabilities than the previously responsible PSAP. As such, process 300 may continuously (e.g., periodically) monitor the location of the requesting device and accordingly update information stored regarding the currently identified PSAP and its capabilities.

In an implementation, in an operation 310, process 300 may detect a triggering event after the current identified PSAP and its capabilities have been obtained and stored.

In an implementation, in an operation 312A, process 300 may automatically generate and transmit an ERC based on the triggering event, the identified PSAP and its capabilities. For example, the triggering event may include a car accident (as determined from sensor information), health condition, or other triggering event for which automatic ERC generation and transmission should occur. In this implementation, process 300 may automatically generate an ERC in a particular format based on the capabilities of the identified PSAP.

In other implementations, in an operation 312B, process 300 may provide selectable options for display to a user based on detection of the triggering event, wherein each selectable option relates to a mode of communication through which the identified PSAP is able to process event-based requests. For example, the triggering event may include a user input (such as activation of a mobile app relating to event-based requests, manipulation of a user input member, dialing of a phone number, etc.). For a PSAP that is able to handle voice and SMS event-based requests, process 300 may provide a first selectable display option corresponding to a voice call and a second selectable display option corresponding to an SMS message. In this implementation, process 300 may obtain a selection of one of the selectable display options. For example, process 300 may receive an election to place an event-based request according to the selected display option. In this manner, the user may be able to select the preferred communication channel through which to place an event-based request. Responsive to such selection, process 300 may generate and transmit an ERC based on the selected display option.

Figure 4:
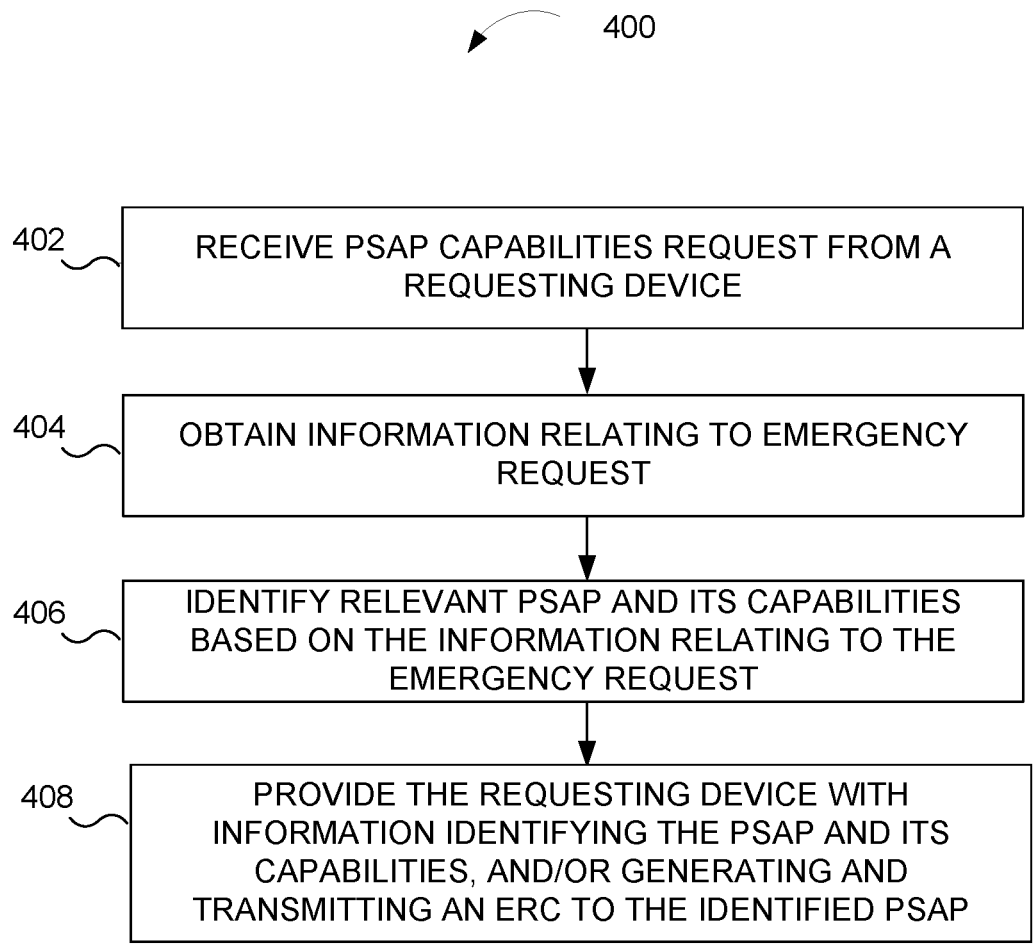
FIG. 4 depicts a process of identifying a relevant resource and providing information relating to its capabilities, according to an implementation of the invention.

FIG. 4 depicts a process 400 of identifying a relevant PSAP and providing information relating to its capabilities, according to an implementation of the invention.

In an operation 402, process 400 may include receiving a PSAP capabilities request from a requesting device.

In an operation 404, process 400 may include obtaining information relating to an event-based request. The information relating to the event-based request may be obtained in association with the PSAP capabilities request. For example, the information may be included with the PSAP capabilities request or as follow-up information from the requesting device. The information may include, without limitation, information identifying a location of the requesting device, a preferred mode of communication, one or more incident parameters, and/or other information.

In an operation 406, process 400 may include identifying a relevant PSAP based on the information obtained in association with the PSAP capabilities request.

In an operation 408, process 400 may provide the requesting device with information identifying the relevant PSAP and its capabilities and/or generating and routing an ERC to the relevant PSAP on behalf of the requesting device.

In some cases, a caller or device may indicate the city and state of the caller/device. According to another aspect of the invention, the platform can use carrier information to detect which City and State the call is coming from, then route the call to the profiled Call center or to a Responder by avoiding call centers, For example, Currently people call a call center for a taxi. The call is to a local number. If instead there is a nationwide number, the system needs the city and state to route the call. The caller may indicate by voice the City and State (e.g., McLean Va.), The voice can be converted to text and data. The cloud service can detect the location and route the call either to the right call taker or responder directly.

Other implementations, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of generating event-based request communications based on capabilities of resources that route event-based requests, the method being implemented in a computer system including one or more physical processors programmed with computer program instructions that, when executed by the one or more physical processors, cause the computer system to perform the method, the method comprising:
    obtaining an identification of a resource, wherein the resource comprises a public safety answering point (PSAP) resource;
    obtaining a capability of the resource;
    generating an event-based request communication (ERC) based on the capability of the resource;
    causing the ERC to be transmitted to the resource, wherein generating the ERC based on the capability of the resource comprises:
        determining, based on the capability of the resource, that the resource is capable of being sent different types of content including a voice content type, a text content type, and a multimedia content type;
        identifying, from the types of content that can be sent to the resource, which type of content is a preferred type of content for the resource, including identifying which one of the voice content type, the text content type, or the multimedia content type is the preferred type of content for the resource based on one of the voice content type, the text content type, and the multimedia content type being selected to be more preferred than the other of the voice content type, the text content type, and the multimedia content type, wherein one or more rules specify a particular format of the preferred type of content that the PSAP resource is capable of handling should be selected; and
        generating the ERC based on the type of content that is the preferred type of content for the resource.

2. The method of claim 1, wherein the capability includes one or more communication channels through which the resource is capable of communicating.

3. The method of claim 2, wherein a communication channel includes a format or medium through which communication can be sent to the resource, and wherein generating the ERC based on the capability of the resource comprises:
    formatting the ERC in the format or medium through which communication of the type of content that is the preferred type of content for the resource can be sent to the resource.

4. The method of claim 3, further comprising:
    initially generating, at a client device, the ERC based on a preferred mode of communication of the client device, including initially generating the ERC in a different format than the format or medium through which communication of the type of content that is the preferred type of content for the resource can be sent to the resource.

5. The method of claim 1, wherein obtaining the capability of the identified resource comprises:
    causing a capability request to be transmitted to a remote computer system via a network; and
    receiving a response to the capability request from the remote computer system via the network, wherein the response includes information indicating the capability of the resource.

6. The method of claim 5, the method further comprising:
    providing a location of a client device to the remote computer system, wherein the resource is identified based on the location of the client device.

7. The method of claim 1, wherein identifying the type of content that is the preferred type of content for the resource is based on richness of the types of content that can be sent to the resource, such that the type of content that is the preferred type of content for the resource is the richest type of content the resource is able to be sent.

8. The method of claim 1, further comprising:
    identifying a preference hierarchy of the types of content that can be sent to the resource, the preference hierarchy including a preference order for the voice content type, the text content type, and the multimedia content type; and
    generating the ERC based on the types of content in accordance with the preference order in response to failed attempts to transmit the ERC to the resource formatted as a given type of content.

9. A system configured to generate event-based request communications based on capabilities of resources that route event-based requests, the system comprising:
    one or more physical processors programmed with computer program instructions to:
        obtain an identification of a resource, wherein the resource comprises a public safety answering point (PSAP) resource;
        obtain a capability of the resource;
        generate an event-based request communication (ERC) based on the capability of the resource; and
        cause the ERC to be transmitted to the resource, wherein generating the ERC based on the capability of the resource comprises:
            determining, based on the capability of the resource, that the resource is capable of being sent different types of content including a voice content type, a text content type, and a multimedia content type;

identifying, from the types of content that can be sent to the resource, which type of content is a preferred type of content for the resource, including identifying which one of the voice content type, the text content type, or the multimedia content type is the preferred type of content for the resource based on one of the voice content type, the text content type, and the multimedia content type being selected to be more preferred than the other of the voice content type, the text content type, and the multimedia content type, wherein one or more rules specify a particular format of the preferred type of content that the PSAP resource is capable of handling should be selected; and generate the ERC based on the type of content that is the preferred type of content for the resource.

10. The system of claim 9, wherein the capability includes one or more communication channels through which the resource is capable of communicating.

11. The system of claim 10, wherein a communication channel includes a format or medium through which communication can be sent to the resource, and wherein generating the ERC based on the capability of the resource comprises formatting the ERC in the format or medium through which communication of the type of content that is the preferred type of content for the resource can be sent to the resource.

12. The system of claim 11, wherein the one or more physical processors are further programmed with the computer program instructions to:

initially generate, at a client device, the ERC based on a preferred mode of communication of the client device, including initially generating the ERC in a different format than the format or medium through which communication of the type of content that is the preferred type of content for the resource can be sent to the resource.

13. The system of claim 9, wherein obtaining the capability of the identified resource comprises:

causing a capability request to be transmitted to a remote computer system via a network; and receiving a response to the capability request from the remote computer system via the network, wherein the response includes information indicating the capability of the resource.

14. The system of claim 13, wherein the one or more physical processors are further programmed with the computer program instructions to:

provide a location of a client device to the remote computer system, wherein the resource is identified based on the location of the client device.

15. The system of claim 9, wherein identifying the type of content that is the preferred type of content for the resource is based on richness of the types of content that can be sent to the resource, such that the type of content that is the preferred type of content for the resource is the richest type of content the resource is able to be sent.

16. The system of claim 9, wherein the one or more physical processors are further programmed with the computer program instructions to:

identify a preference hierarchy of the types of content that can be sent to the resource, the preference hierarchy including a preference order for the voice content type, the text content type, and the multimedia content type; and generate the ERC based on the types of content in accordance with the preference order in response to failed attempts to transmit the ERC to the resource formatted as a given type of content.

* * * * *